(12) United States Patent
Wu et al.

(10) Patent No.: US 10,878,099 B2
(45) Date of Patent: Dec. 29, 2020

(54) HARDWARE ASSISTED FAULT INJECTION DETECTION

(71) Applicant: MAXLINEAR, INC., Carlsbad, CA (US)

(72) Inventors: Qiming Wu, Singapore (SG); Jiaxiang Shi, Singapore (SG)

(73) Assignee: MaxLinear, Inc., Carlsbad, CA (US)

( * ) Notice: Subject to any disclaimer, the term of this patent is extended or adjusted under 35 U.S.C. 154(b) by 196 days.

(21) Appl. No.: 15/824,257

(22) Filed: Nov. 28, 2017

(65) Prior Publication Data

US 2018/0189496 A1 Jul. 5, 2018

(51) Int. Cl.
| | |
|---|---|
| *G06F 21/57* | (2013.01) |
| *G06F 9/30* | (2018.01) |
| *G06F 11/07* | (2006.01) |
| *G06F 9/4401* | (2018.01) |

(52) U.S. Cl.
CPC ........ *G06F 21/575* (2013.01); *G06F 9/30098* (2013.01); *G06F 9/4401* (2013.01); *G06F 11/0772* (2013.01)

(58) Field of Classification Search
CPC .................................................. G06F 21/575
See application file for complete search history.

(56) References Cited

U.S. PATENT DOCUMENTS

| | | | |
|---|---|---|---|
| 2003/0140245 A1* | 7/2003 | Dahan ................. | G06F 9/30047 713/190 |
| 2007/0150730 A1* | 6/2007 | Conti ................... | G06F 1/3287 713/166 |
| 2016/0117210 A1 | 4/2016 | Reichenbach et al. | |

FOREIGN PATENT DOCUMENTS

CN          104732150          6/2015

OTHER PUBLICATIONS

Intellectual Property Office of Singapore Search Report and Written Opinion issued in Application No. 10201700003S dated Aug. 5, 2020; 9 pages.

\* cited by examiner

*Primary Examiner* — Albert Wang
(74) *Attorney, Agent, or Firm* — Maschoff Brennan (57) ABSTRACT

Anti-fault injection systems and methods are disclosed. An anti-fault injection system includes a processor; a boot ROM configured to store a series of boot instructions executable by the processor; and anti-fault injection controller circuitry. The anti-fault injection controller circuitry is accessible to the processor while the processor is executing the boot instructions. The anti-fault injection controller circuitry includes interrupt/reset circuitry configured to interrupt the processor in response to a trigger and secure boot circuitry. The secure boot circuitry is configured to, in response to being accessed by the processor: determine whether the processor is executing non-secure boot instructions in error; and in response to detecting that the processor is executing non-secure boot instructions in error, provide the trigger to the interrupt/reset circuitry.

19 Claims, 5 Drawing Sheets

FIG. 5

HARDWARE ASSISTED FAULT INJECTION DETECTION

REFERENCE TO RELATED APPLICATION

This application claims priority to Singapore application number 10201700003S filed on Jan. 3, 2017, the contents of which are incorporated by reference in their entirety.

FIELD

The present disclosure relates to the field of semiconductor chips and in particular to chips that include security features.

BACKGROUND

Semiconductor chips may be susceptible to attacks during boot. For example, during a secure boot operation, images are read from secure memory that will control many aspects of the chip's operation. If an image other than the intended image (i.e., an image that may have been altered intentionally to adapt the chip's behavior) is read or executed, unexpected chip function may occur. An attacker who is able to cause a chip to boot in the wrong boot mode (e.g., non-secure mode instead of secure mode) may be able to cause the chip to malfunction.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Figure 1:
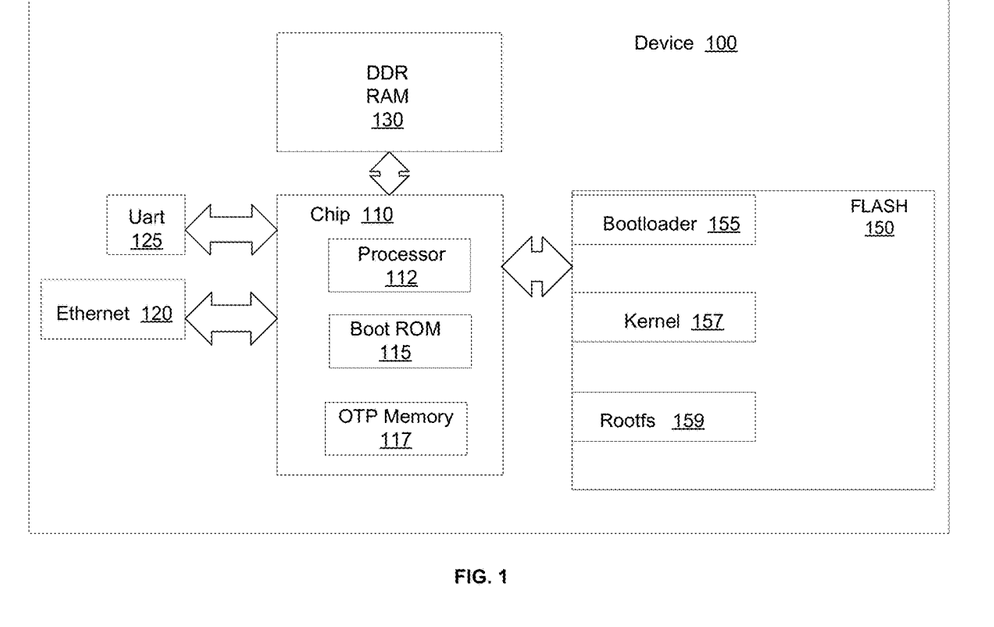
FIG. 1 illustrates an example of a system-on-chip (SOC) that includes a secure boot ROM.

FIG. 1 illustrates an example device 100 that includes a SoC 110. The SoC 110 includes a processor 112 and bootrom 115. The SoC 110 also includes a certain region of memory 117 that is "one time programmable" (OTP) memory, meaning that once the bit values have been set, they cannot be changed by ordinary means. The bootrom 115 is read only memory (ROM) in the SoC that stores the first instructions executed when the processor 112 starts. The device also includes double data rate (DDR) random access memory (RAM) 130 and flash memory 150.

During each boot operation, the bootrom 115 initializes the processor 112, a serial port (uart 125), an Ethernet port 120, and the DDR RAM 130 as well as processor RAM caches. After that, the bootrom 115 copies a bootloader 155 from the flash memory 150 to the DDR 130 and jumps to the bootloader entry in the DDR, thereby handing the control of the processor 112 to the bootloader 155. The bootloader 155 is a program that causes the processor 112 to load an operating system image (i.e., a kernel 157) and a root file system (rootfs) 159 into the DDR RAM 130 for access by the SoC 110 during normal operation. The bootloader 155, the kernel 157, and the root file system 159 are stored in the flash memory 150.

Security is a core issue for any Internet of Things (IoT) gateway. The chain-of-trust is built into the design of gateway products. This chain usually starts with secure boot functionality that ensures that the processor boots up using only trusted images. A robust secure boot is a foundation of a secure gateway product. Some SoCs used in gateway products provide a security function in which a user or manufacturer may set the SoC to perform either a secure boot operation or a non-secure boot operation at each start or restart of the processor. The hardware assisted anti-fault injection systems and methods described herein are also applicable in any product context that may be susceptible to fault injection or other faults that may cause an improper non-secure boot.

Figure 2A:
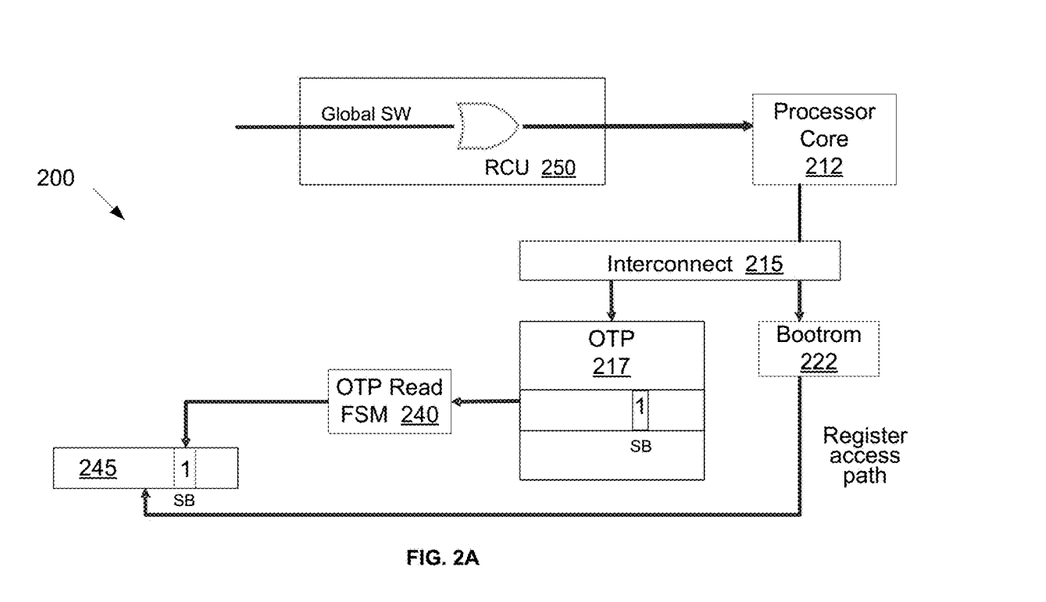
FIG. 2A is a software flow diagram that illustrates a secure boot check operation performed by the SoC of FIG. 1

FIG. 2A illustrates a software flow diagram for an exemplary SoC 200 that can perform either a secure boot operation or a non-secure boot operation. The SoC 200 may be a consumer premises equipment (CPE) home gateway SoC that integrates a secure platform IP engine is thus able to do a secure boot. The SoC includes a core or processor 212 that can be reset (i.e., caused to begin a boot operation) in response to reset control unit (RCU) 250 signal. An interconnect 215 connects the core 212 to a secure "OTP" region 217 and also to a bootrom 222.

To lock the SoC 200 for secure boot mode, a manufacturer of the SoC sets a certain bit (hereinafter the "SB" bit, which for illustration purposes is equal to 1 when secure boot is desired) in a secure "OTP" region 217 of the SoC's ROM. Recall that the memory in the OTP region 217 is one time programmable. When the SB bit is set, the SoC 200 is intended to only perform secure boot operations such as image validation.

An OTP read finite state machine (FSM) 240 reads the value of the SB bit into an SB register 245. During an initial phase of the boot operation, the bootrom 222 controls the processor to read the SB register 245 to determine whether secure boot operation or non-secure boot operation is desired. The processor 212 reads the SB value from the SB register 245 rather than directly from the OTP region 217. This is because it is considered less secure to provide a direct read path from the processor 212 to the OTP region 217 when the processor is under the control of the bootrom 222. When the SB bit is set (or equal to 1), the processor enters secure boot mode in which only boots up validated images.

One known attack is a fault injection attack, which is when an attacker introduces glitches into a power supply (not shown) in the SoC 200. Glitches in the voltage output by the power supply may prevent the processor from executing the boot logic as planned. This is because when the processor is reading or writing a value to memory, the processor will consume certain amount of power. If the supply voltage is dropped during these memory operations, the processor may fail to properly perform certain operations. The processor may make wrong judgement at certain branch points. In extreme cases, the instructions can be skipped altogether.

Figure 2B:
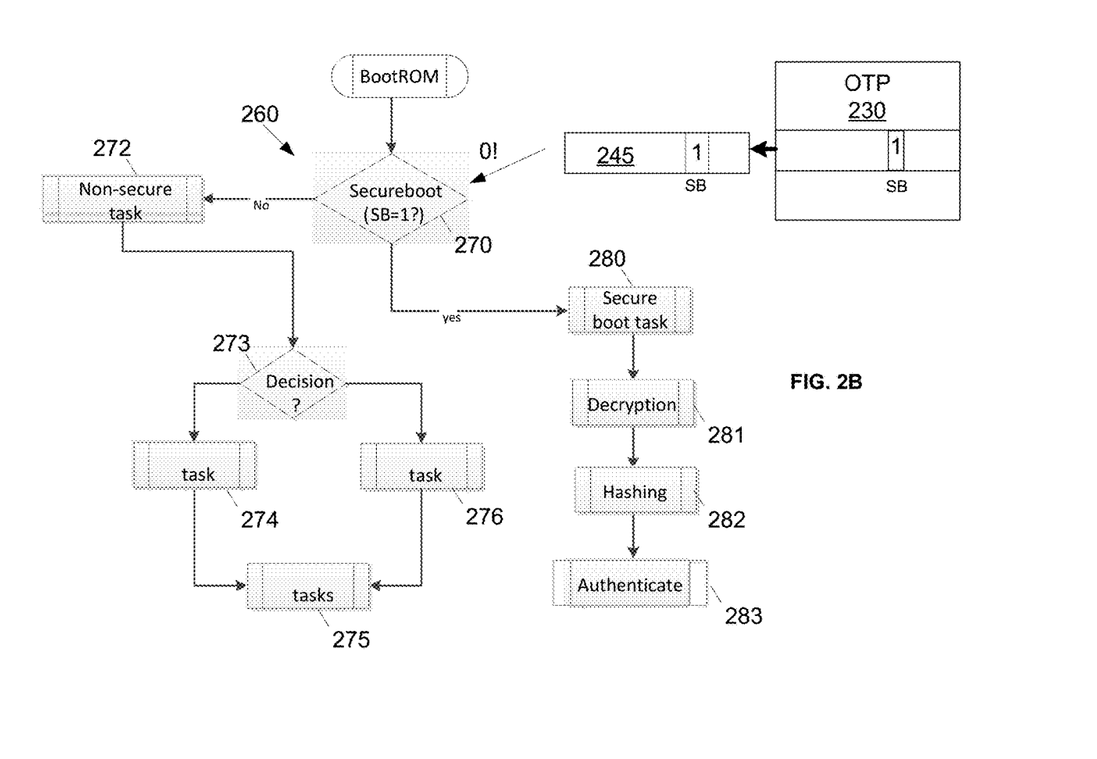
FIG. 2B is a flowchart illustrating a boot process performed by the SoC of FIG. 1 that includes a secure branch of instructions and a non-secure branch of instructions.

FIG. 2B illustrates a boot method 260 that may be performed by the processor 212 when executing instructions in the bootrom 222. The boot method 260 is configured to control the processor to perform either non-secure boot operation (i.e., instructions 272-276 or "non-secure branch") or secure boot operation (i.e., instructions 280-283 or "secure branch"). Note that the secure branch includes instructions that are used to validate an image before booting the image (e.g., decryption, hashing, and authentication). If these secure branch instructions are not executed, a non-secure image may able to boot up the system. The type of boot operation that is performed depends on the SB bit value, which is checked by the processor at 270. If a fault-injection attack happens when the processor 212 is at branch point 270, the processor may read an SB bit value of 0 instead of 1, meaning that the processor selects the wrong branch, the non-secure branch 272-276. So a hacker could use a glitch attack to bypass the secure boot process defined by the bootrom code and could cause a malicious image to be loaded into the SoC without the image being authenticated.

The described hardware assisted anti-fault injection systems and methods use read operations on a hardware-controlled dual behavior register to trigger a reset of the processor when the processor is intended to be operating in secure boot mode (e.g., when the SB bit value is 1) but is instead executing non-secure boot instructions. The described systems and methods are effective against fault injection attacks without requiring a significant increase in the size of the bootrom and with limited additional hardware.

Figure 3A:
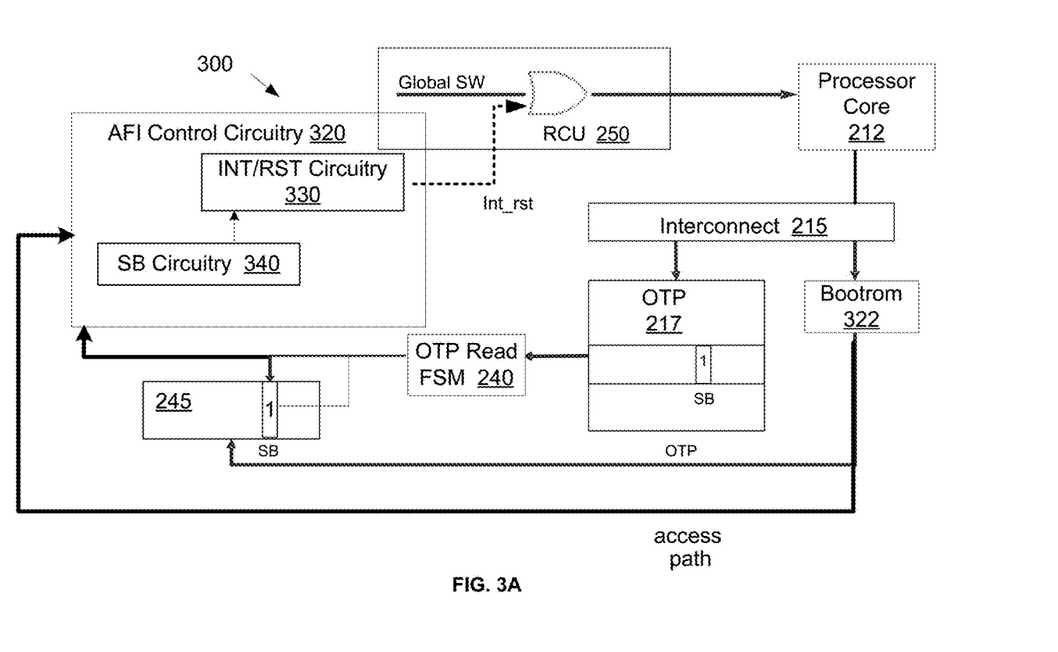
FIG. 3A is a software flow diagram that illustrates example anti-fault injection controller circuitry that performs an anti-fault injection operation during non-secure boot operation of the SoC of FIG. 1
Figure 3B:
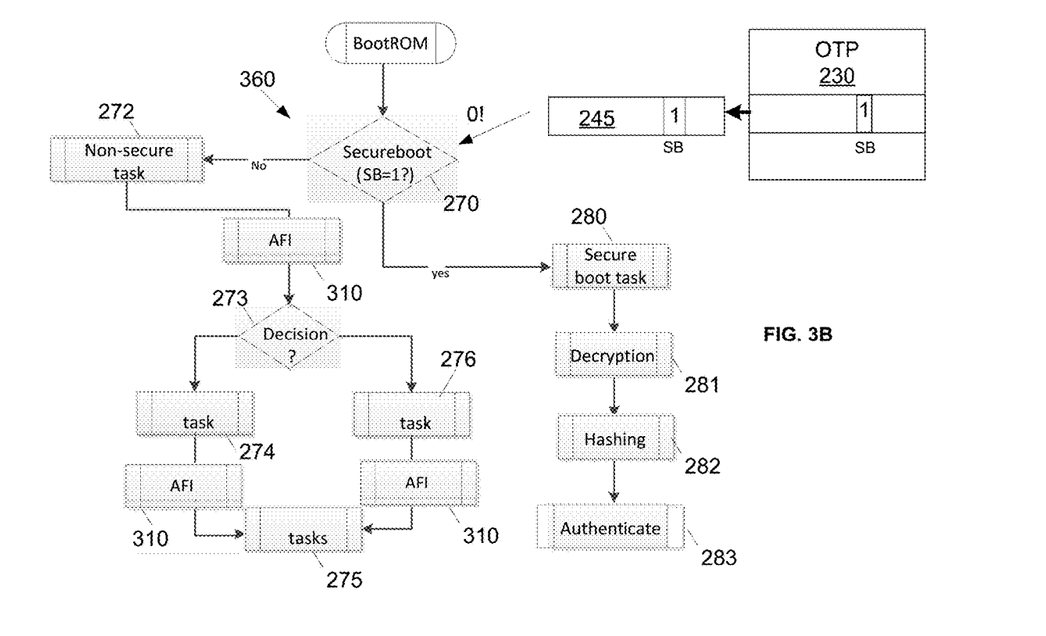
FIG. 3B is a flowchart illustrating an example boot process performed by the SoC of FIG. 1 that includes a non-secure branch of instructions that include anti-fault injection instructions.

FIGS. 3A and 3B illustrate an exemplary hardware-assisted anti-fault injection system and boot method, respectively. FIG. 3A illustrates software flow on a SoC 300 that includes anti-fault injection (AFI) control circuitry 320. Many of the components of the SoC 300 operate in the same manner as those described with respect to SoC 200. Those components have been assigned the same reference characters as in FIG. 2A for simplicity. The AFI control circuitry 320 includes interrupt/reset circuitry 330 and secure boot (SB) circuitry 340. The AFI controller circuitry 340 is accessible to the processor 212 while the processor is executing the bootrom instructions.

The interrupt/reset circuitry 330 is configured to interrupt the processor 212 in response to a trigger. The interrupt/reset circuitry 330 is configured to generate a HW signal having a primary function to reset the processor via the RCU 250. The resetting of the processor can be realized through either an interrupt signal or a reset signal. If an interrupt signal is used, a No-maskable interrupt signal (i.e., no CPU SW involved) may be used to reset the system. For the purposes of this description, an "interrupt" includes either an interrupt or a reset signal or function.

The SB circuitry 340 is configured to, in response to being accessed by the processor 212 executing boot instructions (e.g., stored in the bootrom or the bootloader 155 see FIG. 1), determine whether the processor is executing non-secure boot instructions in error. The SB circuitry 340 includes hardware that triggers the interrupt/reset circuitry 330 to interrupt the processor when the SB bit value is 1 in the SB register 245, which means that the processor is executing non-secure boot instructions in error. The SB circuitry 340 includes hardware that, when accessed by the processor executing boot instructions, does not trigger the interrupt/reset circuitry to generate an interrupt when the processor is not executing non-secure boot instructions in error (e.g., when the SB bit value is 0).

FIG. 3B illustrates a boot method 360. The boot method 360 includes the non-secure branch 272-275 and the secure branch 280-283 of FIG. 2B. The boot method 360 also includes several instances of an AFI instruction 310 that have been inserted into the non-secure branch following non-secure tasks 272-275. While an AFI instruction 310 is inserted after specific non-secure tasks in FIG. 3B, in other embodiments, an AFI instruction is inserted in other locations in the non-secure branch. The AFI instruction 310 causes the processor to access the SB circuitry 340, which will in turn cause the interrupt/reset circuitry 330 to interrupt the processor when the SB bit value is 1 (meaning that the processor should not be executing non-secure boot instructions).

Thus, the hardware assisted anti-fault injection system and method of FIGS. 3A and 3B, respectively utilize hardware implemented AFI control circuitry 320 that, in response to execution of an AFI instruction in the non-secure boot path, triggers an interrupt to the processor when the processor is executing non-secure boot instructions in error (i.e., the SB bit value is 1). Because AFI instructions are present only in the non-secure branch of the boot instructions, it is appropriate that the AFI control circuitry 420 generates an interrupt any time the processor accesses the AFI control circuitry 420 when the SB bit value is 1.

Figure 4A:
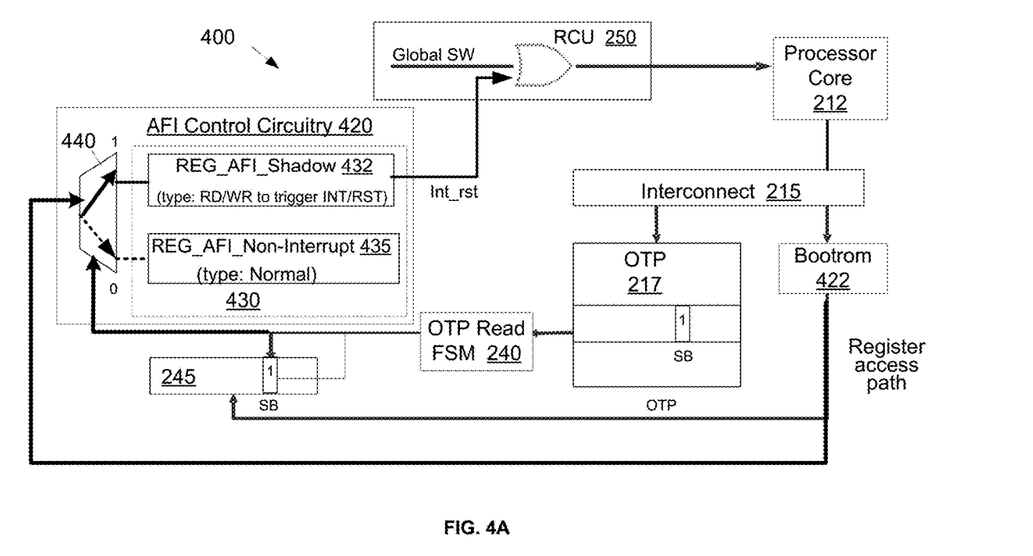
FIG. 4A is a software flow diagram that illustrates another example anti-fault injection controller circuitry that performs an anti-fault injection operation during non-secure boot operation of the SoC of FIG. 1
Figure 4B:
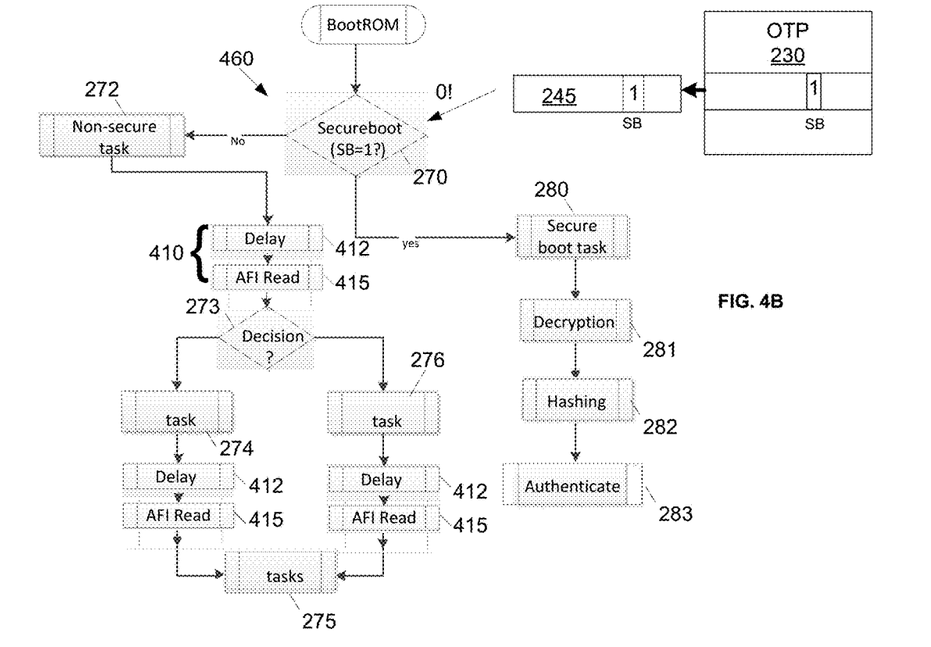
FIG. 4B is a flowchart illustrating another example boot process performed by the SoC of FIG. 1 that includes a non-secure branch of instructions that include anti-fault injection instructions.

FIGS. 4A and 4B illustrate an exemplary hardware-assisted anti-fault injection system and method, respectively. FIG. 4A illustrates software flow in a SoC 400 that includes anti-fault injection (AFI) control circuitry 420. Many of the components of the SoC 400 operate in the same manner as those described with respect to SoC 200 and SoC 300. Those components have been assigned the same reference characters as in FIGS. 2A and 3A for simplicity.

The AFI control circuitry 420 includes interrupt/reset circuitry 430 and SB circuitry 440. The interrupt/reset circuitry 430 is an AFI register, which is in fact two registers: a shadow register 432 and a "normal" register 435. Both the shadow register and the normal register are addressable by an AFI register address associated with the AFI register 430. In other words, the AFI may be conceptualized as a "dual behavior" register that is capable of operating in two different modes, an interrupt mode and a normal (non-interrupt) mode. The shadow register 432 is hardware that, in response to the shadow register being accessed or read, generates an interrupt for the processor 212. The normal register 435 is a register that stores some value. In contrast with the shadow register 432, the reading or access of the normal register 435 by the processor 212 will not generate an interrupt.

The SB value circuitry 440 is a hardware switch whose position is controlled by the SB bit value in the OTP 217 as read by the OTP Read FSM 240. The hardware switch selects either a first read path (shown in solid) to the shadow register 432 or a second read path (shown in dashed) to the normal register 435. Thus, the SB value circuitry or switch controls which of the two registers in the AFI register 430 will be accessed when the processor executes an AFI instruction. If the shadow register is accessed (i.e., the SB bit value is 1), the interrupt is generated. If the normal register is accessed (i.e., the SB bit value is 0), the interrupt is not generated and the non-secure boot process continues.

FIG. 4B illustrates a boot method 460 that may be performed by the processor executing instructions in the bootrom 422. The boot method 460 includes the non-secure branch 272-275 and the secure branch 280-283 of FIG. 4B. The boot method 460 also includes several instances of an AFI instruction 410 that have been inserted into the non-secure branch following non-secure tasks 272-275. While an AFI instruction 410 is inserted after several non-secure task in FIG. 4B, in other embodiments, an AFI instruction is inserted after different selected non-secure tasks. The AFI instruction 410 includes two instructions: i) a delay instruction 412 that injects a random amount of delay prior to execution of the next instruction and ii) an AFI register read instruction 415 that causes the processor to read the AFI register 430.

Recall that if the AFI register 430 is read when the SB bit value is 1, the shadow register 432 is read, which will in turn cause the shadow register 432 to trigger an interrupt signal to reset the processor. When the processor 212 is reset, the boot process begins again and the determination as to whether to enter secure boot mode or non-secure boot mode is revisited by the processor in execution of the boot instructions. If the AFI register 430 is read when the SB bit value is 0, the processor 212 is not interrupted because it is assumed that the processor is not executing non-secure boot instructions in error.

The delay instruction 412 improves the effectiveness of the anti-fault instruction 410 because it injects a random amount of delay prior to the read instruction 415. This means that even if a hacker could determine that the SB bit value was being checked after non-secure boot instructions, the hacker could not determine the exact time at which the SB bit value was being checked by the reading of the AFI register and would have difficulty timing a voltage glitch to interfere with the AFI register check. While the systems and methods described herein are described in the context of a fault injection attack, the systems and methods described herein are equally applicable to any security error caused by misreading or misinterpreting the value of security related bits by the processor due to any type of error.

Figure 5:
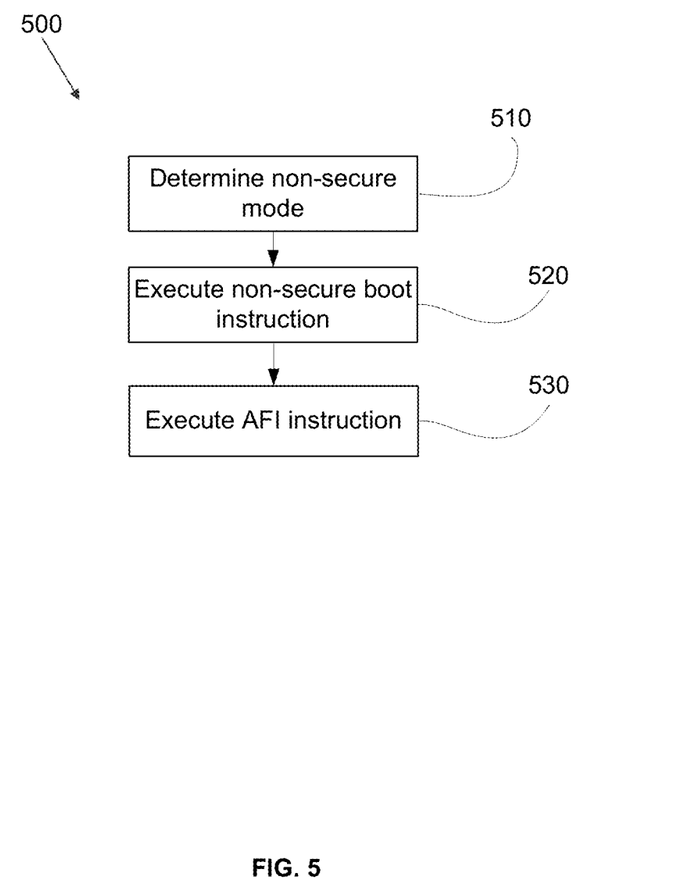
FIG. 5 illustrates one embodiment of a method of protecting against non-secure boot operation caused by a fault-injection error.

FIG. 5 illustrates one example of a method 500 configured to determine if a processor is executing non-secure boot instructions in error. The method 500 may be performed by the processor 212 executing boot instructions stored in bootrom 322 to access the AFI control circuitry 320 of FIG. 3 or boot instructions stored in bootrom 422 to read the AFI register 430 of FIG. 4. The method 500 includes, at 510, executing a first boot instruction to determine that a processor is operating in a non-secure mode. At 520, at least one non-secure boot instruction associated with non-secure mode is executed. The method includes, at 530, executing an anti-fault injection check instruction.

In one exemplary method, the anti-fault injection instruction, when executed, causes the processor to read an anti-fault injection register (e.g., AFI register 430, FIG. 4). In one embodiment, the method further includes delaying, by an amount of time, the reading of the anti-fault injection register after executing the at least one non-secure boot instruction. In one example, the amount of time is based on a random number.

In one embodiment, the reading of the anti-fault injection register is performed by reading a dual behavior register that is mapped to an anti-fault injection register address. The dual behavior register includes i) interrupt hardware (e.g., shadow register 432, FIG. 4A), that when read by the processor, generates an interrupt signal and ii) a non-interrupt register (e.g., normal register 435, FIG. 4A), and further wherein the reading is performed by reading one of i) the interrupt hardware on a first read path or ii) the non-interrupt register on a second read path. In one example, the first read path or the second read path is selected by a hardware switch (e.g., SB circuitry 440, FIG. 4) that is controlled by a value of a secure boot bit in a OTP region of memory (e.g., OTP region 117, 217, FIG. 1, FIGS. 2-4). The secure boot bit is also read (via the mapped register 245 (FIGS. 2-4) by the processor during execution of the first boot instruction.

It can be seen from the foregoing description that the described hardware assisted anti-fault injection systems and methods provide significant protection against non-secure operation due to fault injection attacks with only minor hardware and software changes. The described solutions do not significantly increase the size of the bootrom or the complexity of the boot logic.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Example 1 is an anti-fault injection system that includes a processor; a boot ROM configured to store a series of boot instructions executable by the processor; and anti-fault injection controller circuitry. The anti-fault injection controller circuitry is accessible to the processor while the processor is executing the boot instructions and includes an interrupt/reset circuitry configured to interrupt the processor in response to a trigger and secure boot circuitry. The secure boot circuitry is configured to, in response to being accessed by the processor: determine whether the processor is executing non-secure boot instructions in error; and in response to detecting that the processor is executing non-secure boot instructions in error, provide the trigger to the interrupt/reset circuitry.

Example 2 includes the subject matter of claim 1, including or omitting optional elements, wherein the interrupt/reset circuitry includes hardware that is configured to generate an interrupt signal in response to reading of an AFI register address by the processor; and the secure boot circuitry includes a switch configured to connect a first read path between the AFI register address and the interrupt/reset circuitry when the processor is executing non-secure boot instructions in error, such that when the AFI register address is read by the processor on the first read path, the interrupt signal is generated.

Example 3 includes the subject matter of claim 2, including or omitting optional elements, wherein the secure boot circuitry is configured to provide a second read path between the AFI register address and a non-interrupt register when the processor is not executing non-secure boot instructions in error, such that when the AFI register address is read by the processor on the second read path, the interrupt signal is not generated.

Example 4 includes the subject matter of claim 2, including or omitting optional elements, wherein the secure boot circuitry is configured to: read a secure boot bit value in one time programmable (OTP) memory; and when the secure boot bit has a predetermined value, connect the first read path; and when the secure boot bit does not have the predetermined value, connect the second read path.

Example 5 includes the subject matter of claim 1, including or omitting optional elements, wherein the processor, the boot ROM, and the anti-fault controller circuitry are embodied in a gateway device.

Example 6 includes the subject matter of claims 2-5, including or omitting optional elements, wherein the boot instructions include: a set of instructions that define a secure boot path; and a set of instructions that define a non-secure boot path; and wherein the non-secure boot path includes one or more instances of an anti-fault injection instruction, where the anti-fault injection instruction includes a register read instruction that, when executed by the processor, causes the processor to read the anti-fault injection register.

Example 7 includes the subject matter of claim 6, including or omitting optional elements, wherein the anti-fault injection instruction includes a delay instruction that, when executed by the processor, delay the execution of the register read instruction by a randomly selected amount of time.

Example 8 is a method, including: executing a first boot instruction to determine that a processor is operating in a non-secure mode; executing at least one non-secure boot instruction associated with non-secure mode; and executing an anti-fault injection check instruction.

Example 9 includes the subject matter of claim 8, including or omitting optional elements, wherein the anti-fault injection instruction, when executed, causes the processor to read an anti-fault injection register.

Example 10 includes the subject matter of claim 9, including or omitting optional elements, further including delaying, by an amount of time, the reading of the anti-fault injection register after executing the at least one non-secure boot instruction.

Example 11 includes the subject matter of claim 10, including or omitting optional elements, wherein the amount of time is based on a random number.

Example 12 includes the subject matter of claims 9-11, including or omitting optional elements, wherein the reading of the anti-fault injection register is performed by reading a dual behavior register that is mapped to an anti-fault injection register address, wherein the dual behavior register comprises i) interrupt hardware that, when read by the processor, generates an interrupt signal and ii) a non-interrupt register, and further wherein the reading comprises reading one of the interrupt hardware on a first read path or the non-interrupt register on a second read path.

Example 13 includes the subject matter of claim 12, including or omitting optional elements, wherein the first read path or the second read path is selected by a hardware switch that is controlled by a value of a secure boot bit in OTP memory, wherein a register storing the value is read by the processor during execution of the first boot instruction.

Example 14 is anti-fault injection control circuitry including interrupt/reset circuitry configured to interrupt a processor in response to a trigger and secure boot circuitry. The secure boot (SB) circuitry is configured to detect when the processor is executing non-secure boot instructions in error; and in response to detecting that the processor is executing non-secure boot instructions in error, trigger the interrupt/reset circuitry to interrupt the processor.

Example 15 includes the subject matter of claim 14, including or omitting optional elements, wherein the interrupt/reset circuitry includes hardware that is configured to generate an interrupt signal in response to read operation being performed on an AFI register address by the processor; and the SB circuitry includes a switch configured to connect a first read path between the AFI register address and the interrupt/reset circuitry when the processor is executing non-secure boot instructions in error, such that when the AFI register address is read by the processor on the first read path, the interrupt signal is generated.

Example 16 includes the subject matter of claim 15, including or omitting optional elements, wherein the SB circuitry is configured to provide a second read path between the AFI register address and a non-interrupt register when the processor is not executing non-secure boot instructions in error, such that when the AFI register address is read by the processor on the second read path, the interrupt signal is not generated.

Example 17 includes the subject matter of claims 15-16, including or omitting optional elements, wherein the SB circuitry is configured to: read a secure boot bit in an OTP memory via a finite state machine and when the secure boot bit has a predetermined value, connect the first read path; and when the secure boot bit does not have the predetermined value, connect the second read path.

Example 18 includes the subject matter of claim 17, including or omitting optional elements, wherein a register storing a value of the secure boot bit is read by the processor during execution of boot instructions that determine whether to branch to a secure boot branch or a non-secure boot branch.

Example 19 includes the subject matter of claims 15-16, including or omitting optional elements, wherein the non-secure boot instructions include one or more instances of an anti-fault injection instruction, where the anti-fault injection instruction includes a register read instruction that, when executed by the processor, causes the processor to read the anti-fault injection register.

Example 20 includes the subject matter of claim 19, including or omitting optional elements, wherein the anti-fault injection instruction includes a delay instruction that, when executed by the processor, delay the execution of the register read instruction by a randomly selected amount of time.

Example 21 is an apparatus, including a processor; a boot ROM configured to store a series of boot instructions executable by the processor; means for determining whether the processor is executing non-secure boot instructions in error; means for interrupting the processor in response to a trigger. The means for determining provides the trigger to the means for interrupting in response to detecting that the processor is executing non-secure boot instructions in error.

Example 22 includes the subject matter of claim 21, including or omitting optional elements, wherein: the means for interrupting comprises hardware that is configured to generate an interrupt signal in response to reading of an AFI register address by the processor; and the means for determining comprises a switch configured to connect a first read path between the AFI register address and the interrupt/reset circuitry when the processor is executing non-secure boot instructions in error, such that when the AFI register address is read by the processor on the first read path, the interrupt signal is generated.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

What is claimed is:

1. An anti-fault injection system, comprising:
   a processor;
   a boot ROM configured to store a series of boot instructions executable by the processor;
   anti-fault injection controller circuitry accessible to the processor while the processor is executing the boot instructions, the anti-fault injection controller circuitry comprising:
      interrupt circuitry configured to interrupt the processor in response to a trigger;
      secure boot circuitry configured to, in response to being accessed by the processor:
         determine whether the processor is executing non-secure boot instructions in error; and
         in response to detecting that the processor is executing non-secure boot instructions in error, provide the trigger to the interrupt circuitry.

2. The anti-fault injection system of claim 1, wherein:
   the interrupt circuitry comprises hardware that is configured to generate an interrupt signal in response to reading of an anti-fault injection (AFI) register address by the processor; and
   the secure boot circuitry comprises a switch configured to connect a first read path between the AFI register address and the interrupt circuitry when the processor is executing non-secure boot instructions in error, such that when the AFI register address is read by the processor on the first read path, the interrupt signal is generated.

3. The anti-fault injection system of claim 2, wherein the secure boot circuitry is configured to provide a second read path between the AFI register address and a non-interrupt register when the processor is not executing non-secure boot instructions in error, such that when the AFI register address is read by the processor on the second read path, the interrupt signal is not generated.

4. The anti-fault injection system of claim 2, wherein the secure boot circuitry is configured to:
read a secure boot bit value in one time programmable (OTP) memory; and
when the secure boot bit has a predetermined value, connect the first read path; and
when the secure boot bit does not have the predetermined value, connect the second read path.

5. The anti-fault injection system of claim 1, wherein the processor, the boot ROM, and the anti-fault controller circuitry are embodied in a gateway device.

6. The anti-fault injection system of claim 2, wherein the boot instructions include:
a set of instructions that define a secure boot path; and
a set of instructions that define a non-secure boot path; and
wherein the non-secure boot path includes one or more instances of an anti-fault injection instruction, where the anti-fault injection instruction includes a register read instruction that, when executed by the processor, causes the processor to read the anti-fault register.

7. The anti-fault injection system of claim 6, wherein the anti-fault injection instruction includes a delay instruction that, when executed by the processor, delay the execution of the register read instruction by a randomly selected amount of time.

8. A method, comprising:
executing a first boot instruction to determine that a processor is operating in a non-secure mode;
executing at least one non-secure boot instruction associated with the non-secure mode; and
executing an anti-fault injection instruction,
wherein the anti-fault injection instruction, when executed, causes the processor to read an anti-fault injection register.

9. The method of claim 8, further comprising delaying, by an amount of time, the reading of the anti-fault injection register after executing the at least one non-secure boot instruction.

10. The method of claim 9, wherein the amount of time is based on a random number.

11. The method of claim 8, wherein the reading of the anti-fault injection register is performed by reading a dual behavior register that is mapped to an anti-fault injection register address, wherein the dual behavior register comprises i) interrupt hardware that, when read by the processor, generates an interrupt signal and ii) a non-interrupt register, and further wherein the reading comprises reading one of the interrupt hardware on a first read path or the non-interrupt register on a second read path.

12. The method of claim 11, wherein the first read path or the second read path is selected by a hardware switch that is controlled by a value of a secure boot bit in one-time programmable (OTP) memory, wherein a register storing the value is read by the processor during execution of the first boot instruction.

13. Anti-fault injection control circuitry accessible to a processor while the processor is executing boot instructions, the anti-fault injection controller circuitry comprising:
interrupt circuitry configured to interrupt the processor in response to a trigger;
secure boot (SB) circuitry configured to, in response to being accessed by the processor:
detect whether the processor is executing non-secure boot instructions in error; and
in response to detecting that the processor is executing non-secure boot instructions in error, provide the trigger to the interrupt circuitry to interrupt the processor.

14. The anti-fault injection control circuitry of claim 13, wherein:
the interrupt circuitry comprises hardware that is configured to generate an interrupt signal in response to read operation being performed on an anti-fault injection (AFI) register address by the processor; and
the SB circuitry comprises a switch configured to connect a first read path between the AFI register address and the interrupt circuitry when the processor is executing non-secure boot instructions in error, such that when the AFI register address is read by the processor on the first read path, the interrupt signal is generated.

15. The anti-fault injection of claim 14, wherein the SB circuitry is configured to provide a second read path between the AFI register address and a non-interrupt register when the processor is not executing non-secure boot instructions in error, such that when the AFI register address is read by the processor on the second read path, the interrupt signal is not generated.

16. The anti-fault injection control circuitry of claim 14, wherein the SB circuitry is configured to:
read a secure boot bit in an one-time programmable (OTP) memory via a finite state machine; and
when the secure boot bit has a predetermined value, connect the first read path; and
when the secure boot bit does not have the predetermined value, connect the second read path.

17. The anti-fault injection control circuitry of claim 16, wherein a register storing a value of the secure boot bit is read by the processor during execution of boot instructions that determine whether to branch to a secure boot branch or a non-secure boot branch.

18. The anti-fault injection control circuitry of claim 14, wherein the non-secure boot instructions include one or more instances of an anti-fault injection instruction, where the anti-fault injection instruction includes a register read instruction that, when executed by the processor, causes the processor to read the anti-fault register.

19. The anti-fault injection control circuitry of claim 18, wherein the anti-fault injection instruction includes a delay instruction that, when executed by the processor, delay the execution of the register read instruction by a randomly selected amount of time.

* * * * *